(12) United States Patent
Moran et al.

(10) Patent No.: US 10,351,068 B2
(45) Date of Patent: Jul. 16, 2019

(54) VEHICLE GLOVEBOX ASSEMBLY HAVING SEPARATELY OPERABLE INNER AND OUTER DOORS

(71) Applicant: Ford Global Technologies, LLC, Dearborn, MI (US)

(72) Inventors: Alan Moran, Canton, MI (US); Glenn Biddinger, Livonia, MI (US); Ryan Kosior, South Lyon, MI (US); Angela Zaetta, Canton, MI (US); Linneya Knight, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/817,974

(22) Filed: Nov. 20, 2017

(65) Prior Publication Data

US 2019/0152403 A1    May 23, 2019

(51) Int. Cl.
  *B60R 7/06*    (2006.01)
  *E05C 19/16*   (2006.01)
  *E05B 83/30*   (2014.01)
  *E05D 1/00*    (2006.01)

(52) U.S. Cl.
  CPC .............. *B60R 7/06* (2013.01); *E05B 83/30* (2013.01); *E05C 19/16* (2013.01); *E05D 1/00* (2013.01)

(58) Field of Classification Search
  CPC ............ B60R 7/06; E05B 83/30; E05C 19/16
  USPC .............................................. 296/37.8, 37.12
  See application file for complete search history.

(56) References Cited

U.S. PATENT DOCUMENTS

| | | | | |
|---|---|---|---|---|
| 2,301,730 A | * | 11/1942 | Mann ........................ | B60R 7/06 224/281 |
| 2,820,687 A | * | 1/1958 | Waring ................... | B60N 3/002 108/42 |
| 4,355,837 A | * | 10/1982 | Shimizu .................... | B60R 7/06 296/37.12 |
| 4,560,602 A | | 12/1985 | Draper | |
| 4,902,061 A | | 2/1990 | Plavetich et al. | |
| 4,930,737 A | * | 6/1990 | McNeill .................... | B60R 7/06 224/542 |
| 5,143,265 A | * | 9/1992 | Schultz .................... | B60N 3/12 224/483 |
| 6,050,628 A | | 4/2000 | Allison et al. | |
| 7,201,434 B1 | | 4/2007 | Michalak et al. | |
| 7,293,507 B2 | * | 11/2007 | Depue .................... | B60N 3/002 108/152 |
| 7,874,587 B2 | | 1/2011 | Miki et al. | |
| 8,011,710 B2 | * | 9/2011 | Stueber ................... | B60N 3/107 296/24.34 |
| 8,528,956 B1 | * | 9/2013 | Winiger .................... | B60R 7/04 296/24.34 |
| 8,562,058 B1 | | 10/2013 | Kim | |
| 8,714,093 B2 | * | 5/2014 | Rigner ..................... | B60R 7/06 108/45 |

(Continued)

*Primary Examiner* — Gregory A Blankenship
(74) *Attorney, Agent, or Firm* — Vichit Chea; Price Heneveld LLP

(57) ABSTRACT

A glovebox assembly includes a housing having an aperture for accessing an interior volume. An inner flap is rotationally coupled to the housing and is operable to a securing position within the aperture that at least partially encloses the interior volume. An outer door is rotationally coupled to the housing and selectively operable to an open position to access the interior volume wherein the outer door is operable independently of the inner flap.

17 Claims, 8 Drawing Sheets

(56) References Cited

U.S. PATENT DOCUMENTS

| | | | |
|---|---|---|---|
| 8,740,278 B1* | 6/2014 | Mally | B60R 7/06 |
| | | | 296/37.12 |
| 2002/0101090 A1* | 8/2002 | Steingrebe | B60R 5/003 |
| | | | 296/37.8 |
| 2007/0007787 A1* | 1/2007 | Park | B60R 7/06 |
| | | | 296/37.8 |
| 2008/0067085 A1* | 3/2008 | Schneider | B60R 7/06 |
| | | | 206/223 |
| 2008/0231065 A1* | 9/2008 | Merlo | B60R 7/06 |
| | | | 296/37.5 |
| 2011/0025074 A1 | 2/2011 | Reznar | |
| 2011/0084511 A1* | 4/2011 | Evans | B60R 7/06 |
| | | | 296/37.12 |
| 2012/0119536 A1* | 5/2012 | Quijano | B60R 7/06 |
| | | | 296/37.8 |
| 2013/0057011 A1* | 3/2013 | Yamagishi | B60R 7/04 |
| | | | 296/24.34 |
| 2016/0052454 A1* | 2/2016 | Xu | B60R 7/04 |
| | | | 296/37.8 |
| 2018/0201172 A1* | 7/2018 | Faruque | B60N 3/002 |

* cited by examiner

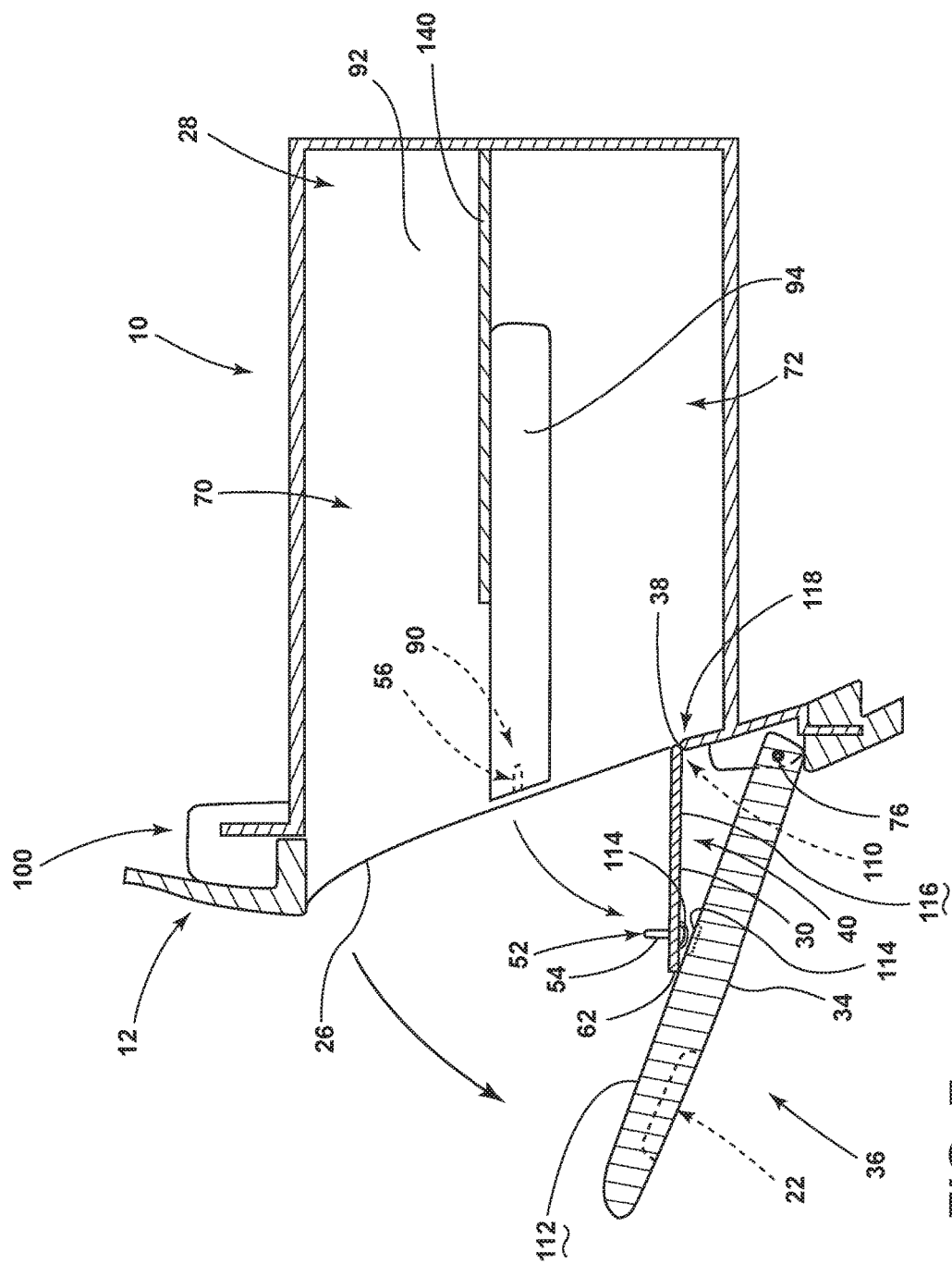

VEHICLE GLOVEBOX ASSEMBLY HAVING SEPARATELY OPERABLE INNER AND OUTER DOORS

FIELD OF THE INVENTION

The present invention generally relates to vehicle storage compartments, and more specifically, a vehicle glovebox having an operable outer door and separately operable inner panel for partially containing items when the outer door is in an open position.

BACKGROUND OF THE INVENTION

Within various vehicles, storage compartments are included for containing various items. These compartments can include a glovebox that is typically positioned within a dashboard or instrument panel of the vehicle. These storage areas can include rotationally operable outer doors that can be opened and closed for accessing an interior volume and also for securing items within this interior volume.

SUMMARY OF THE INVENTION

According to one aspect of the present invention, a glovebox assembly includes a housing having an aperture for accessing an interior volume. An inner flap is rotationally coupled to the housing and is operable to a securing position within the aperture that at least partially encloses the interior volume. An outer door is rotationally coupled to the housing and is selectively operable to an open position to access the interior volume wherein the outer door is operable independently of the inner flap.

Embodiments of the first aspect of the invention can include any one or a combination of the following features:
- the inner flap is integrally formed with the housing
- the inner flap is rotationally coupled to the housing at a living hinge
- a primary latch that couples with the outer door to define a closed position of the outer door
- a secondary latch disposed proximate the aperture of the housing, wherein the secondary latch selectively couples with a portion of the inner flap to define the securing position
- wherein the inner flap in the securing position defines a secondary aperture that is formed between an upper edge of the inner flap and the aperture
- the interior volume is a continuous volume, wherein the inner flap in the securing position divides the interior volume into upper and lower sections
- the inner flap in the securing position at least partially surrounds the lower section of the interior volume
- the secondary latch is defined by a tab on the inner flap and a corresponding tab recess defined within the housing proximate the aperture According to another aspect of the present invention, a vehicle storage compartment includes a housing having an interior volume with upper and lower sections. An inner flap is rotationally operable to selectively surround only the lower section of the interior volume. An outer door is rotationally operable independent of the inner flap and is operable to selectively enclose the upper and lower sections.

Embodiments of the second aspect of the invention can include any one or a combination of the following features:
- the inner flap is rotationally coupled to the housing at a living hinge
- a primary latch that couples with the outer door to define a closed position of the outer door
- a primary latch that couples with the outer door to define a closed position of the outer door
- a secondary latch disposed proximate an aperture of the housing, wherein the secondary latch selectively couples with a portion of the inner flap to define a securing position
- the interior volume is a continuous volume, wherein the inner flap in a securing position divides the interior volume into upper and lower sections
- the inner flap is coupled to the housing at a primary aperture, wherein operation of the inner flap to an access position provides access to the upper and lower sections of the interior volume via the primary aperture
- the inner flap in the securing position defines a secondary aperture between the inner flap and the primary aperture, wherein the secondary aperture provides access to the upper section of the interior volume
- the housing is fixed within a storage area and the outer door is rotationally operable relative to the housing
- the secondary latch is magnetically operated According to another aspect of the present invention, a vehicle includes a glovebox housing having an interior volume. An inner flap is integral with the housing and is rotationally operable about a living hinge to selectively enclose a portion of the interior volume. An outer door is operable in a manner independent of the inner flap to selectively enclose the inner flap and the interior volume.

Embodiments of the third aspect of the invention can include any one or a combination of the following features:
- the glovebox housing is fixed within a storage area and the outer door is rotationally coupled to the glovebox housing at a hinge
- the interior volume includes upper and lower sections, and wherein the inner flap is operable to a securing position that selectively encloses only the lower section of the interior volume
- a primary latch that couples with the outer door to define a closed position of the outer door
- a secondary latch disposed proximate an aperture of the housing, wherein the secondary latch selectively couples with a portion of the inner flap to define the securing position
- the outer door is fixedly coupled to the housing and the outer door and the glovebox housing are rotationally operable within a storage area between closed and open positions
- the inner flap is operable about the living hinge when the outer door is away from the closed position These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is a cross-sectional view of the glovebox assembly of FIG. 6 and showing the outer door in an open position and the inner flap in an access position;

DETAILED DESCRIPTION OF THE PREFERRED EMBODIMENTS

Figure 1:
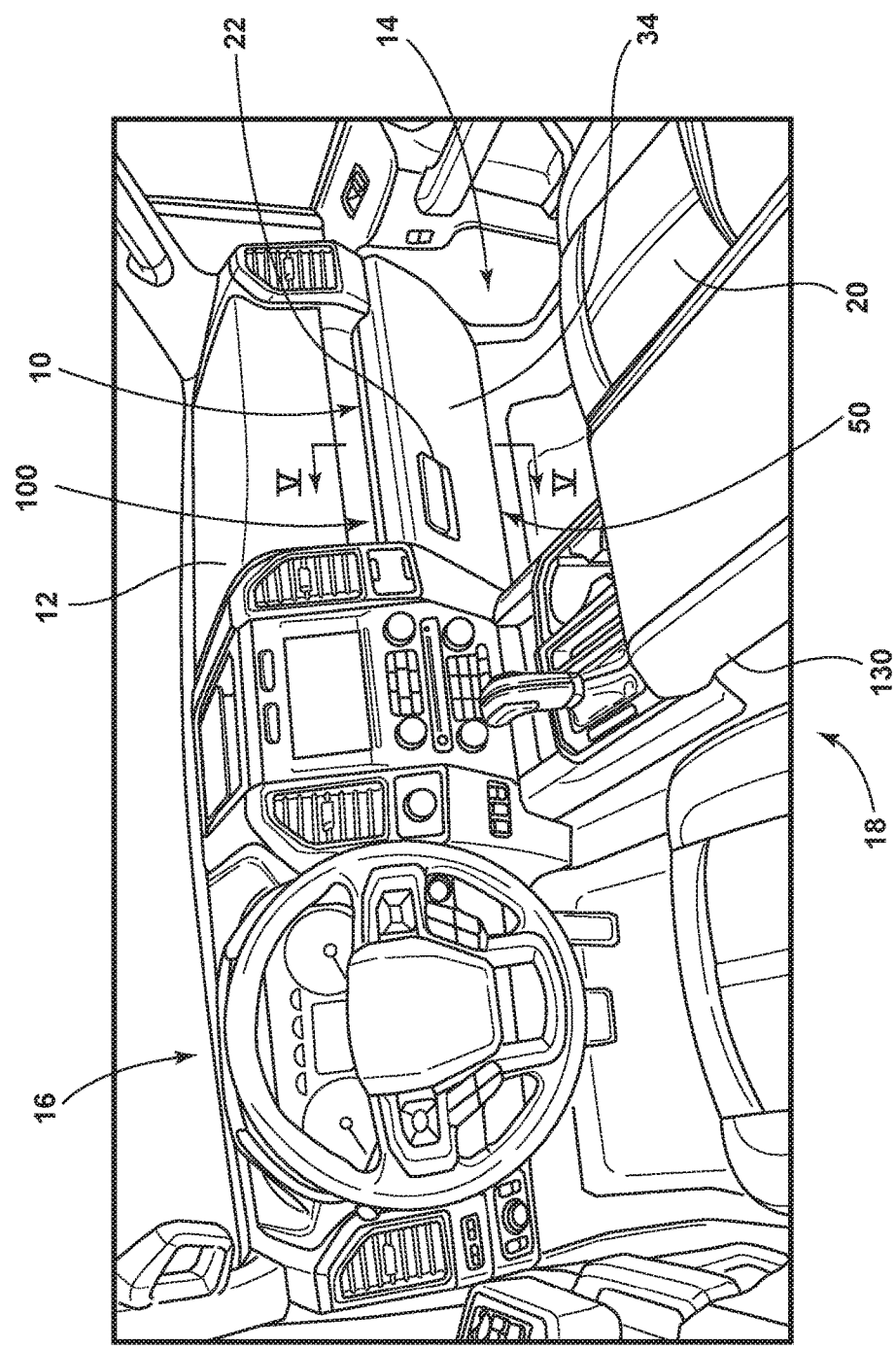
FIG. 1 is a perspective view of an instrument panel for a vehicle that incorporates an aspect of the glovebox assembly.
Figure 2:
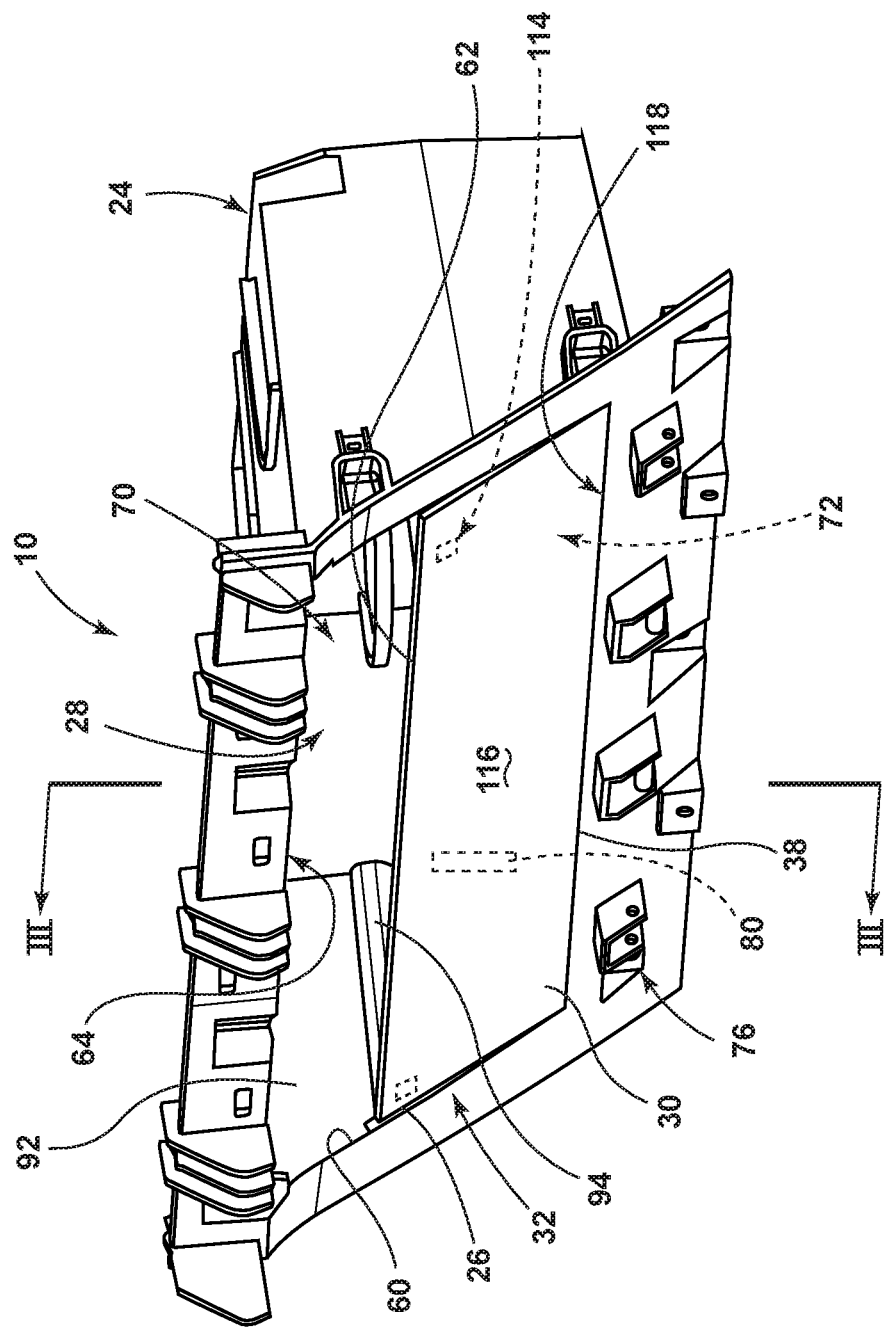
FIG. 2 is a side perspective view of an aspect of the glovebox assembly shown with the outer door removed and the inner flap shown in a securing position.
Figure 3:
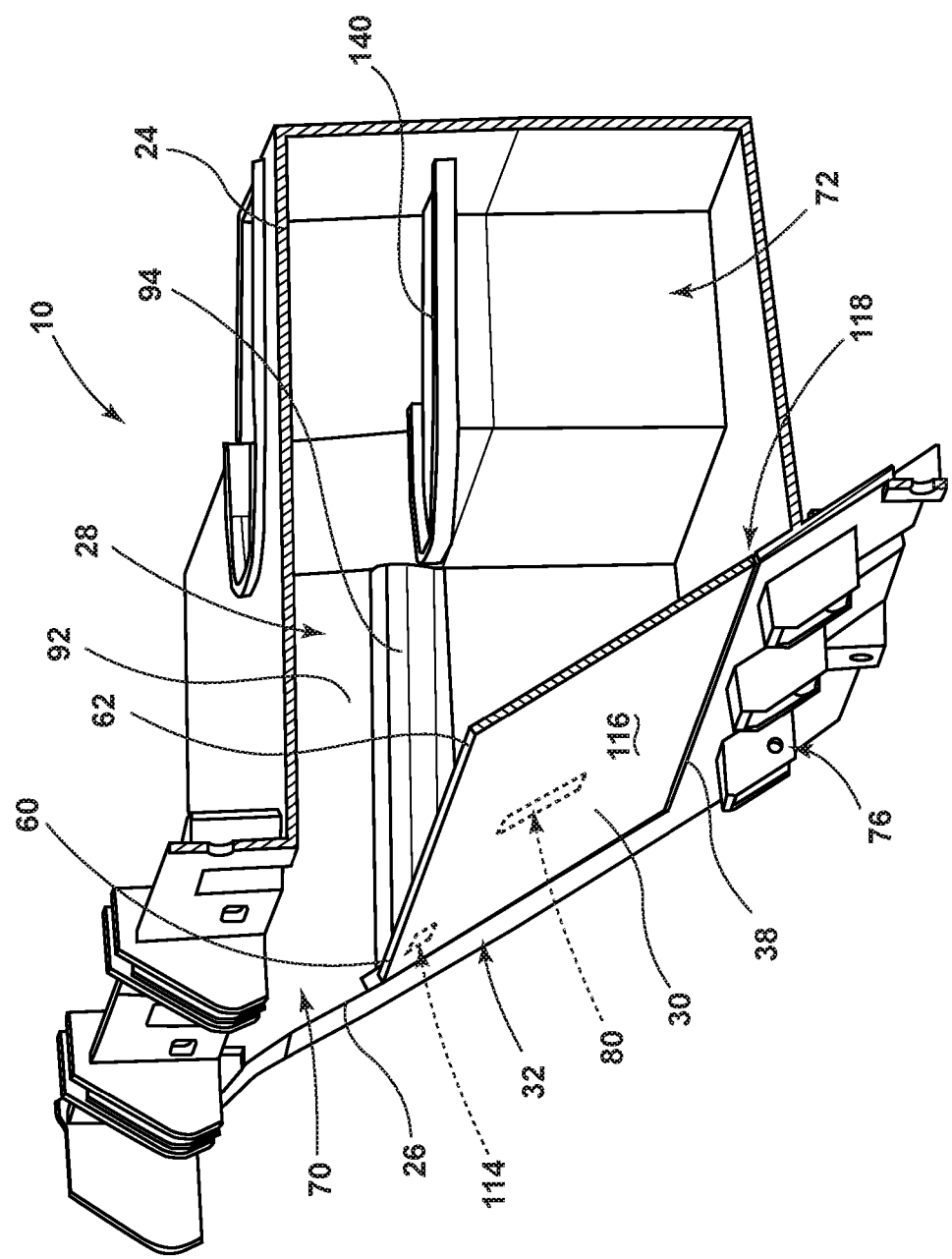
FIG. 3 is a cross-sectional view of the glovebox assembly of FIG. 2 taken along line III-III.
Figure 4:
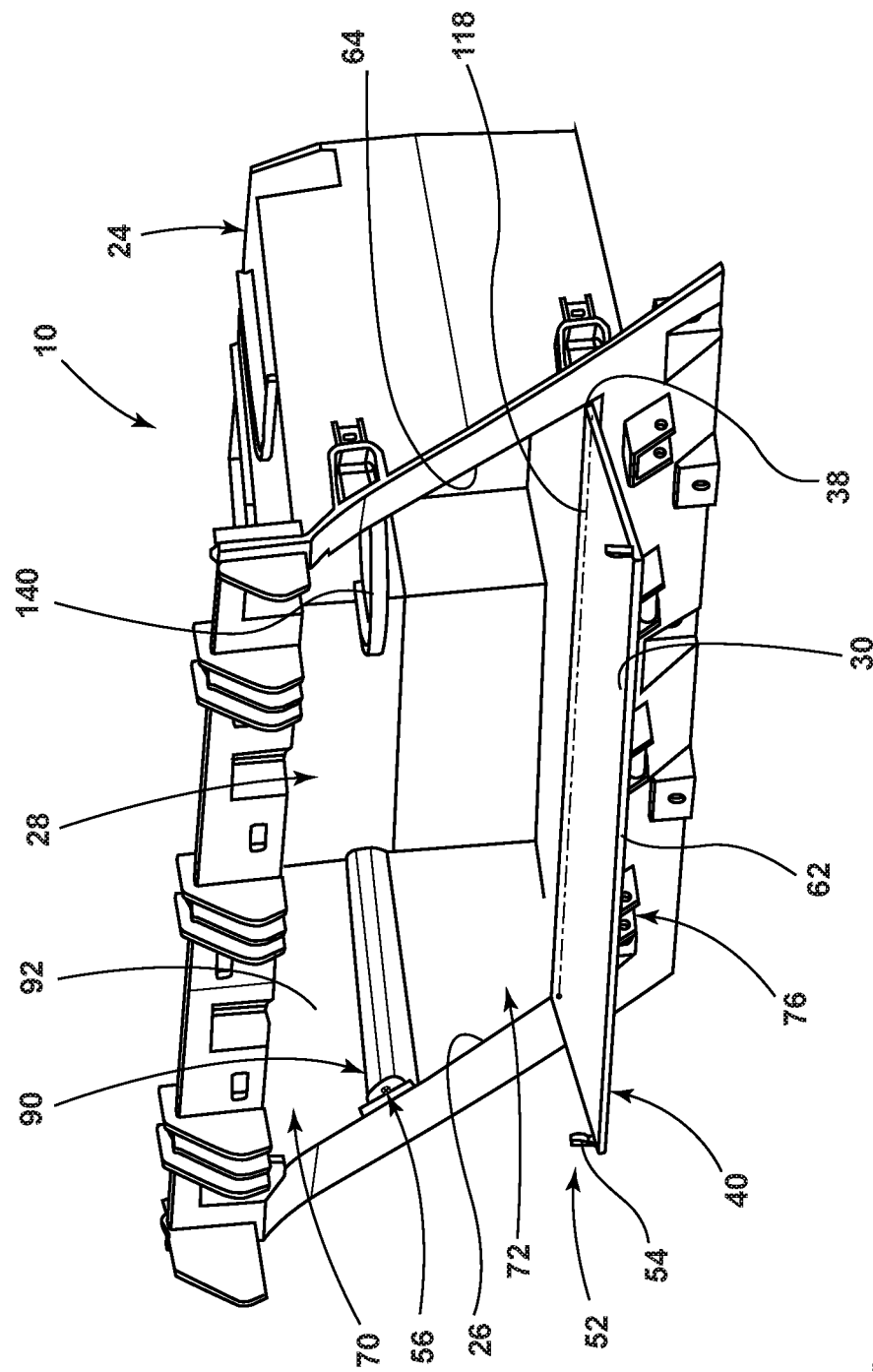
FIG. 4 is a side perspective view of the glovebox assembly of FIG. 2 with the inner flap shown in an access position.
Figure 5:
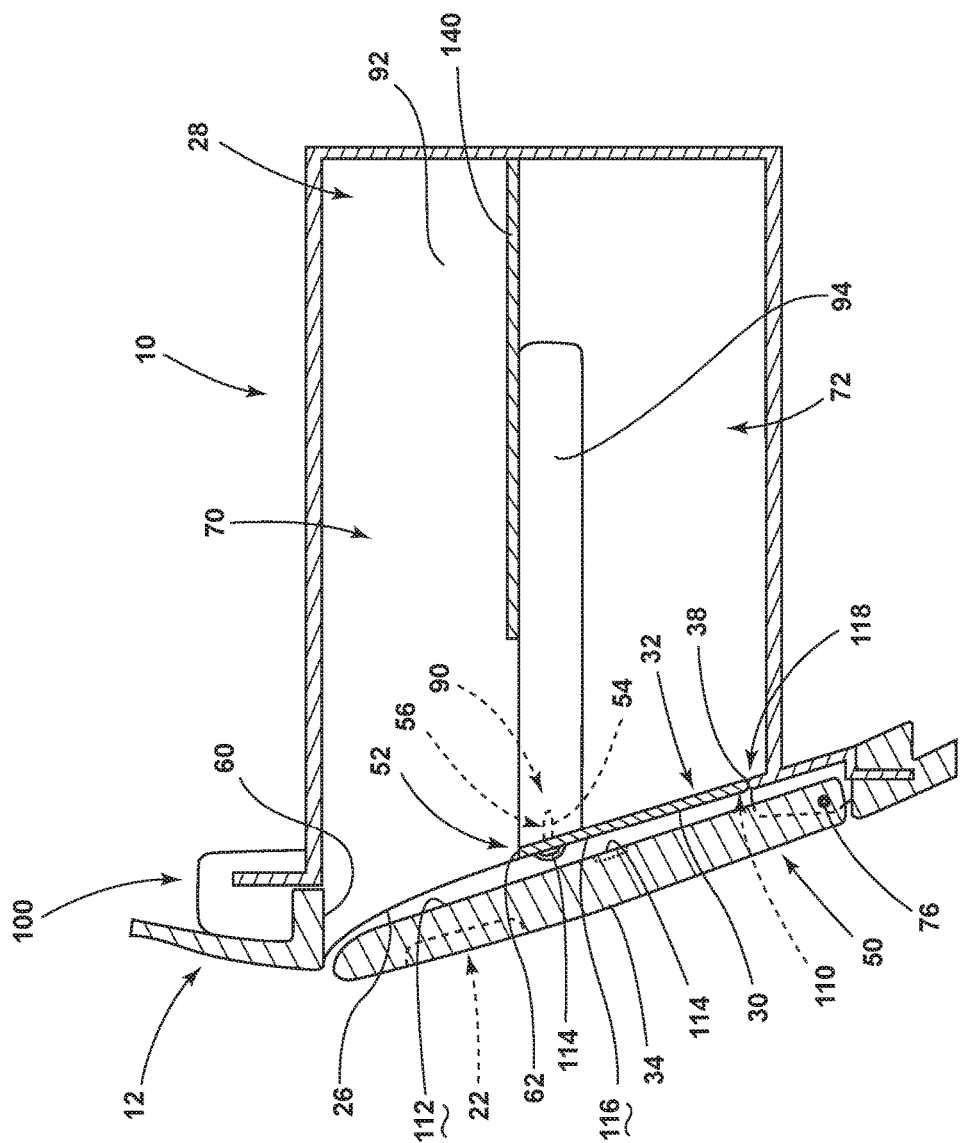
FIG. 5 is a cross-sectional view of the glovebox assembly of FIG. 1, taken along line V-V and shown with the inner flap in the securing position and the outer door in the closed position.
Figure 6:
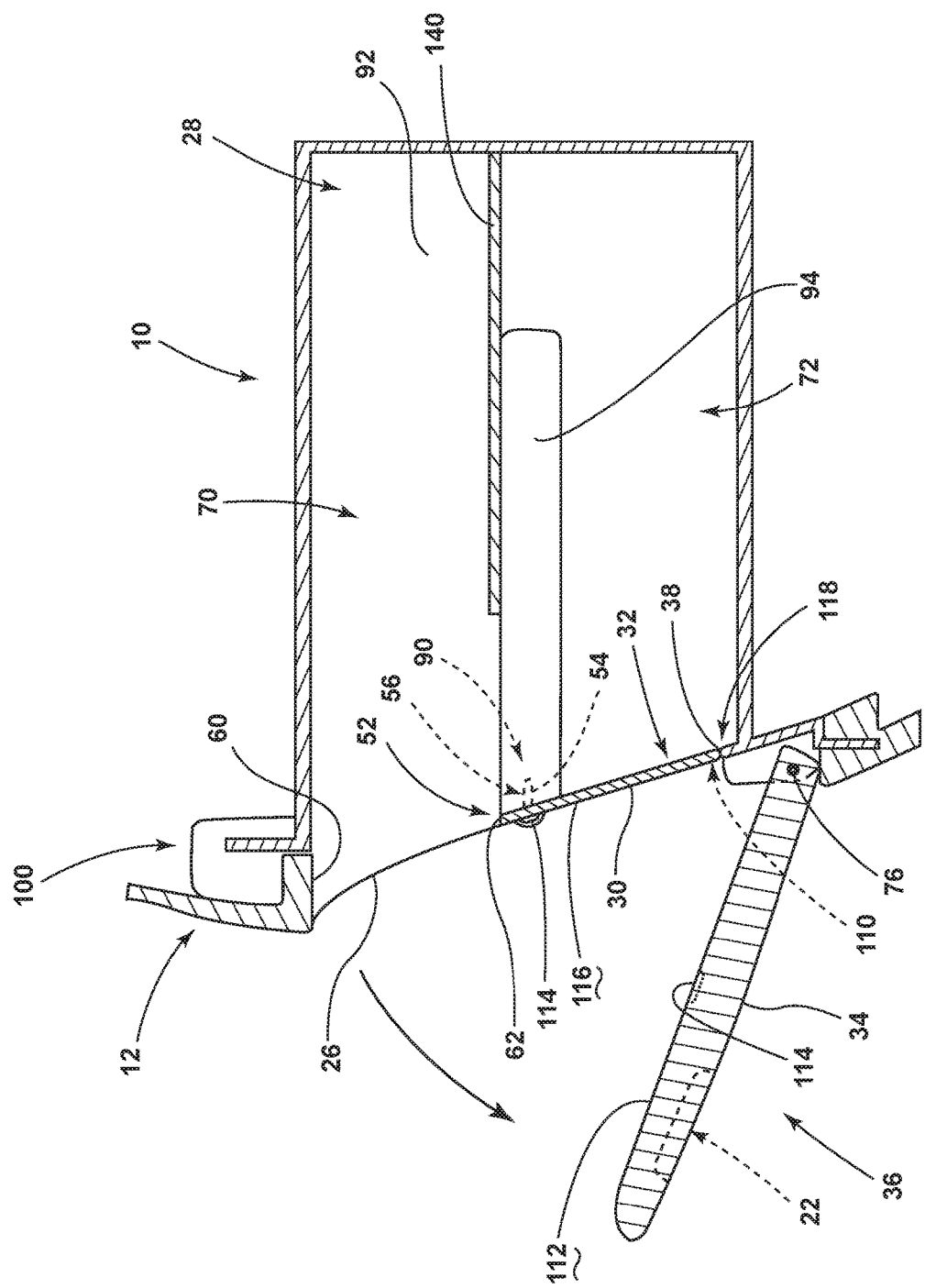
FIG. 6 is a cross-sectional view of the glovebox assembly of FIG. 5 showing the outer door in an open position and the inner flap in the securing position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-7, reference numeral 10 generally refers to a glovebox assembly that is disposed within a dashboard 12 set within a front portion 14 of a passenger compartment 16 of a vehicle 18. The glovebox assembly 10 is typically positioned near the passenger seat 20. At least a portion of the glovebox assembly 10 is rotationally operable with respect to the dashboard 12. A latch 22 can be included within the glovebox assembly 10 for securing rotational portions of the glovebox assembly 10 in a fixed position with respect to the dashboard 12. According to various aspects of the device, the glovebox assembly 10 can include a housing 24 having an aperture 26 for accessing an interior volume 28 defined within the housing 24. An inner flap 30 is rotationally coupled to the housing 24, where the inner flap 30 is operable to a securing position 32 within the aperture 26. This securing position 32 of the inner flap 30 at least partially encloses the interior volume 28. An outer door 34 is rotationally coupled to the housing 24 and is configured to be selectively operable to an open position 36. In this open position 36, the outer door 34 provides access to the interior volume 28. The outer door 34 is also operable independently of the inner flap 30. According to various aspects of the device, the inner flap 30 is integrally formed with the housing 24. Additionally, it is typical that the inner flap 30 is rotationally coupled to the housing 24 at a living hinge 38. This living hinge 38 allows for rotational operation of the inner flap 30 between the securing position 32 and an access position 40, where the inner flap 30 is rotated out of the aperture 26 of the housing 24.

Referring again to FIGS. 1-7, the glovebox assembly 10 can include a primary latch 22 that couples the outer door 34 to a portion of the housing 24 or the dashboard 12 to define a closed position 50 of the outer door 34. This primary latch 22 is selectively operable to detach the outer door 34 from the dashboard 12 to allow for rotational operation of the outer door 34 from the closed position 50 to the open position 36. The glovebox assembly 10 can also include a secondary latch 52 disposed proximate the aperture 26 of the housing 24. This secondary latch 52 is configured to selectively couple with a portion of the inner flap 30 to define the securing position 32 of the inner flap 30. This secondary latch 52 can take the form of a tab 54 that is disposed on one of the inner flap 30 and the housing 24 that mates with a corresponding tab recess 56 defined within the other of the housing 24 and the inner flap 30. In this manner, the tab 54 and the tab recess 56 can be selectively coupled to define the securing position 32 of the inner flap 30. The secondary latch 52 can include various securing mechanisms. These securing mechanisms can include, but are not limited to, clasps, hooks, magnetic connectors, mating protrusions, hook and loop connectors, push-push connectors, combinations thereof, and other similar connecting mechanisms that can be used to selectively secure the inner flap 30 in the securing position 32. Typically, the secondary latch will utilize one of the tabs 54 and tab recesses 50, or can be magnetically operated using magnetic connectors.

According to various aspects of the device, the use of the inner flap 30 serves to at least partially enclose the interior volume 28 of the housing 24. In this manner, items disposed within the interior volume 28 of the housing 24 can be at least partially secured therein and prevented from falling out when the user operates the outer door 34 from the closed position 50 to the open position 36. The inner flap 30 in the securing position 32 defines a secondary aperture 60 that is formed between the upper edge 62 of the inner flap 30 and the perimeter 64 of the aperture 26. A user of the glovebox assembly 10 can reach through this secondary aperture 60 for accessing portions of the interior volume 28 for placing smaller items into, or removing smaller items from, the interior volume 28 of the glovebox assembly 10. With the inner flap 30 in the securing position 32, items contained within the interior volume 28 are substantially prevented from falling or sliding out from the interior volume 28 when the outer door 34 is operated to the open position 36. Where larger items are to be accessed within the interior volume 28, the inner flap 30 can be operated from the securing position 32 to the access position 40 for allowing use of the entire aperture 26 for inserting or removing larger items from the interior volume 28 of the glovebox assembly 10.

Referring again to FIGS. 2-7, the interior volume 28 of the housing 24 for the glovebox assembly 10 is typically a continuous volume. The inner flap 30 that is rotationally operable with respect to the housing 24 is configured to divide the aperture 26 and, in turn, the interior volume 28 when the inner flap 30 is in the securing position 32. In the securing position 32, the inner flap 30 divides the interior volume 28 into upper and lower sections 70, 72. The upper section 70 of the interior volume 28 is that portion of the interior volume 28 that is generally above the upper edge 62 of the inner flap 30 that defines the secondary aperture 60 through which the user can access the interior volume 28 when the inner flap 30 that is in the securing position 32. The lower section 72 of the interior volume 28 is that portion of the interior volume 28 that is bound, surrounded or otherwise contained by the inner flap 30 in the securing position 32. When the inner flap 30 is moved to the access position 40, the upper and lower sections 70, 72 of the interior volume 28 are each generally accessible through the aperture 26 defined by the housing 24.

Referring now to FIGS. 1-9, the vehicle storage compartment, typically in the form of a glovebox assembly 10, can include the housing 24 that includes the interior volume 28 having upper and lower sections 70, 72. As discussed previously, the upper and lower sections 70, 72 of the interior volume 28 are typically a continuous volume. The inner flap 30 is rotationally operable to selectively surround only the lower section 72 of the interior volume 28. Accordingly, the upper and lower sections 70, 72 of the interior volume 28 may be delineated when the inner flap 30 is in the securing position 32. In this manner, the upper section 70 of the interior volume 28 is continually accessible so long as the outer door 34 is in the open position 36. The outer door 34 of the glovebox assembly 10 is rotationally operable independent of the inner flap 30. The outer door 34 is also operable to selectively enclose both of the upper and lower sections 70, 72 of the interior volume 28. As discussed above, the outer door 34 and inner flap 30 are typically operable independent of one another.

In various aspects of the device, when the outer door 34 is in the open position 36 and the inner flap 30 is in the access position 40 (as shown in FIG. 7), movement of the outer door 34 to the closed position 50 can also serve to bias the inner flap 30 back to the securing position 32 and allow for engagement of the secondary latch 52 to secure the inner flap 30 in the securing position 32. In various aspects of the device, operation of the inner flap 30 to the securing position 32 can also provide feedback to the user about whether the interior volume 28 is overloaded with objects.

By way of example, and not limitation, where the interior volume 28 is overloaded with items, it may be difficult to move the outer door 34 to the closed position 50. It may also be difficult to move the inner flap 30 to the securing position 32. Where the interior volume 28 is overloaded, the objects within the interior volume 28 may serve as an obstruction to movement of the inner flap 30 to the securing position 32. Where the inner flap 30 cannot be moved to the securing position 32, the inner flap 30 may at least partially abut a portion of the outer door 34 and prevent the outer door 34 from engaging the primary latch 22. This configuration can serve as feedback to the user that the interior compartment of the housing 24 is overloaded and items need to be reconfigured or items may need to be removed to allow for closure of the outer door 34 and the inner flap 30.

Figure 9:
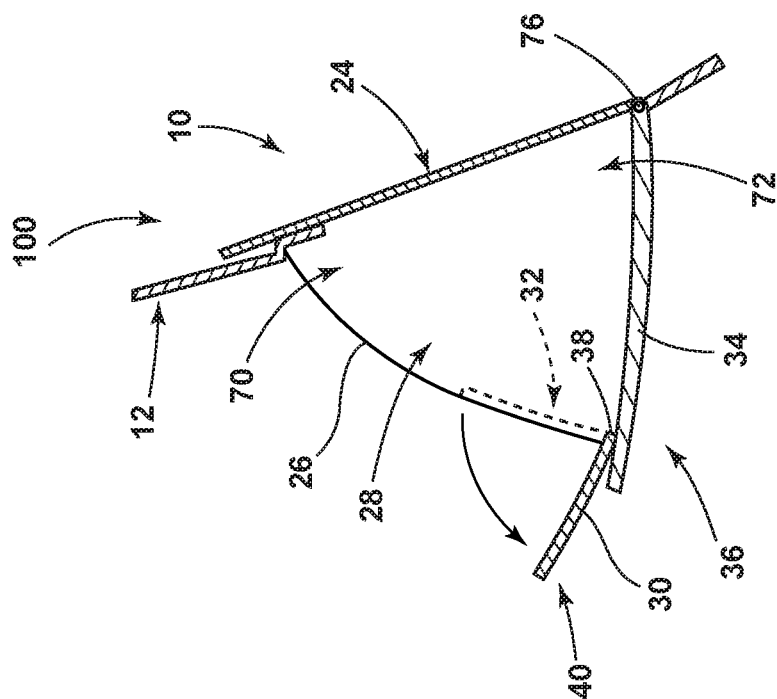
FIG. 9 is a schematic cross-sectional view of the glovebox assembly of FIG. 8 showing the outer door in an open position and the inner flap in an access position.
Figure 8:
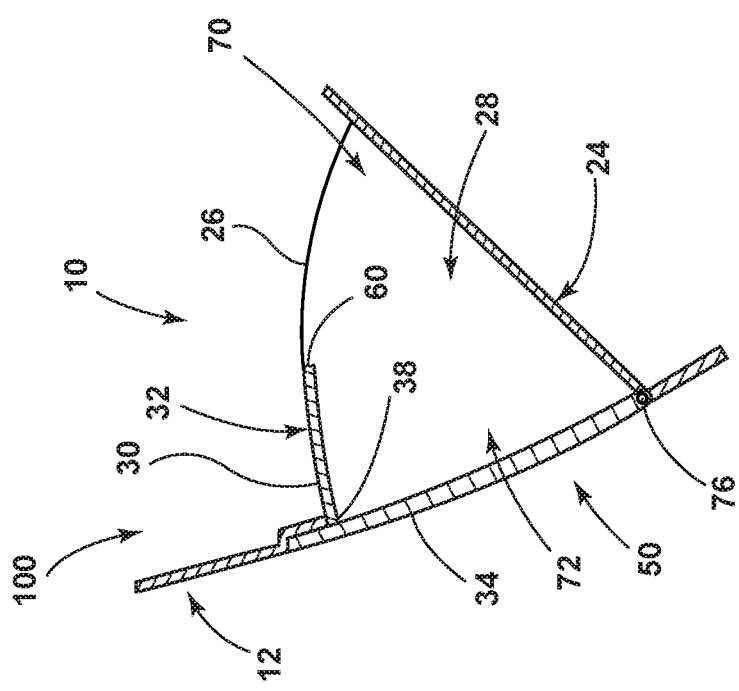
FIG. 8 is a schematic cross-sectional view of an alternate aspect of the glovebox assembly where the outer door is in a closed position and the inner flap is in a securing position, and where the outer door is attached to the housing and are rotationally operable within a dashboard of a vehicle.

Referring now to FIGS. 8 and 9, it is contemplated that the outer door 34 can be in a fixed position with respect to the housing 24 of the glovebox assembly 10. In such a configuration, the housing 24 and outer door 34 can be rotationally operable within the dashboard 12 or instrument panel. Accordingly, movement of the outer door 34 between the open and closed positions 36, 50 also serves to rotate the housing 24 along with the outer door 34. In the aspects of the device exemplified in FIGS. 8 and 9, rotation of the outer door 34 to the open position 36 rotates the outer door 34, the housing 24 and the inner flap 30 about a primary pivot 76. When the outer door 34 is moved to the open position 36, the inner flap 30, as exemplified in FIG. 9, partially encloses the interior volume 28 to define the upper and lower sections 70, 72 thereof. Where desired, the inner flap 30 can be moved to the access position 40 to provide clearance through the primary aperture 26 of the housing 24. This clearance provides for the movement of larger items through the primary aperture 26 and also allows for the removal of items from, and placement of items within, the lower section 72 of the interior volume 28. The use of the inner flap 30 in this configuration of the glovebox assembly 10 serves to assist in preventing items contained within the interior volume 28 of the glovebox assembly 10 from sliding or falling out of the housing 24 for the glovebox assembly 10 as the housing 24 rotates about the primary pivot 76. This configuration allows for better organization of items contained within the glovebox assembly 10. The use of the inner flap 30 also provides for containment of items within the glovebox assembly 10 while also providing for selective access to the entire interior volume 28 where desired.

Referring again to FIGS. 1-9, the inner flap 30 is typically coupled to the housing 24 at the primary aperture 26. Operation of the inner flap 30 to the access position 40 provides access to the upper and lower sections 70, 72 of the interior volume 28 via the primary aperture 26. When the inner flap 30 is in the securing position 32, the inner flap 30 defines the secondary aperture 60 between the upper edge 62 of the inner flap 30 and the primary aperture 26. This secondary aperture 60 serves to provide access to the upper section 70 of the interior volume 28, while at the same time, at least partially containing the lower section 72 of the interior volume 28.

As exemplified in FIGS. 2-7, the housing 24 can be a stationary member that is fixed within a dashboard 12 or other interior component of the vehicle 18. In such a configuration, the outer door 34 is rotationally operable with respect to the housing 24. The outer door 34 can be operable about the primary pivot 76 to rotate the outer door 34 between the open and closed positions 36, 50. As discussed previously, and as exemplified in FIGS. 8 and 9, an alternative aspect of the glovebox assembly 10 can include a housing 24 that is fixedly attached to the outer door 34, where each of the outer door 34 and the housing 24 are rotationally operable about the primary pivot 76 between the open and closed positions 36, 50.

Referring again to FIGS. 1-9, a vehicle 18 can include a housing 24 for the glovebox assembly 10, where the housing 24 includes the interior volume 28. The inner flap 30 is configured to be integral with the housing 24. In such a configuration, the inner flap 30 is rotationally operable about the living hinge 38 to selectively enclose a portion of the interior volume 28. According to various aspects of the device, the inner flap 30 can occupy substantially all of the primary aperture 26 for the housing 24. In such a configuration, the inner flap 30 can include a grasping feature 80 such as a grasping aperture or grasping handle defined therein to allow for operation of the inner flap 30 between securing and access positions 32, 40. Typically, the inner flap 30 will extend only partially within the primary aperture 26 and the user can operate the inner flap 30 by grasping the upper edge 62 of the inner flap 30 for operation between the securing and access positions 32, 40. The outer door 34 for the glovebox assembly 10 is typically operable independent of the inner flap 30 to selectively enclose the inner flap 30 and the interior volume 28 when the outer door 34 is in the closed position 50. When the outer door 34 is moved from the closed position 50 to the open position 36, this movement will typically result in little to no movement of the inner flap 30 away from the securing position 32.

As exemplified in FIGS. 2-7, the secondary latch 52 that selectively secures the inner flap 30 to the housing 24 can include a receiving portion 90 that is defined within a sidewall 92 of the housing 24. This receiving portion 90 can be contained within a structural rib 94 or protrusion defined within the sidewall 92 of the housing 24. Within this receiving portion 90 of the secondary latch 52, various operable portions or receiving members that cooperate with the inner flap 30 can be used to selectively secure the inner flap 30 in the securing position 32.

Referring again to FIGS. 1-9, the outer door 34 can be fixedly coupled to the housing 24 and the outer door 34 in the glovebox housing 24 can be rotationally operable in a storage area 100 defined within the dashboard 12. In such an embodiment, the glovebox housing 24 and the outer door 34 can be operated between closed and open positions 50, 36. In this embodiment, the inner flap 30 is operable about the living hinge 38 when the outer door 34 is positioned away from the closed position 50.

In various aspects of the device, the connection between the inner flap 30 and the housing 24 can be a living hinge 38. This operable connection can also be in the form of a different type of hinge where the inner flap 30 and housing 24 are separate members that are attached together at this secondary pivot 118. Such hinges can include, but are not limited to, piano hinges, selectively detachable hinges, spring hinges, concealed hinges, and other similar types of hinges.

In various aspects of the device, the inner flap 30 can include a biasing mechanism 110 that serves to bias the inner flap 30 toward the securing position 32. In this configuration, the user can hold the inner flap 30 in the access position 40 while accessing the interior volume 28 of the housing 24. In such an embodiment, it is also contemplated that the inner surface 112 of the outer door 34 can include a secondary fastener 114. This secondary fastener 114 can couple with an outer surface 116 of the inner flap 30 to maintain the inner flap 30 in the access position 40. This secondary fastener 114 can overcome the biasing force of the biasing mechanism 110 that tends to operate the inner flap 30 toward the securing position 32. Such a secondary fastener 114 can typically be in the form of magnets, hook-and-loop fasteners, or other similar surface-to-surface attachment mechanisms that can be at least partially concealed or hidden within the inner flap 30 and the outer door 34 of the glovebox assembly 10. This secondary fastener 114 can be configured so that it will engage the inner flap 30 to the outer door 34 while the outer door 34 is in the open position 36. The inner flap 30 rotates about the secondary pivot 118 that is offset from the primary pivot 76. This configuration allows the position of the inner flap 30 to change with respect to the outer door 34 as the inner flap 30 and the outer door 34 rotate. In this manner, the secondary fastener 114 can be positioned so that it will not engage when the inner flap 30 is in the securing position 32. However, the secondary fastener 114 will typically engage when the outer door 34 is in the open position 36 and the inner flap 30 is moved into the access position 40.

In configurations where the inner flap 30 is integrally formed with the housing 24, the inner flap 30 can be co-molded with the housing 24 to define the living hinge 38 about which the inner flap 30 operates with respect to the housing 24. In this manner, the housing 24 and the inner flap 30 can be formed within a single mold to form these portions of the glovebox assembly 10. In various aspects of the device, the inner flap 30 can be separately injection molded onto a portion of the housing 24 to define the living hinge 38 and the inner flap 30 or selectively surrounding the lower section 72 of the interior volume 28.

According to various aspects of the device, as shown in FIGS. 1-9, the combination of the inner flap 30 and outer door 34 can be included within the various storage areas 100 within the vehicle 18. These storage areas 100 can include, but are not limited to, gloveboxes, storage areas 100 within a center console 130 of the vehicle 18, storage areas 100 within a trunk space of the vehicle 18, other storage areas 100 within the passenger compartment 16 of the vehicle 18, and other similar sections of the vehicle 18.

In various aspects of the device, as exemplified in FIGS. 2-7, the interior volume 28 can include one or more medial shelves 140 that are defined within the glovebox assembly 10. Medial shelves 140 can cooperate with the inner flap 30 while in the securing position 32 to substantially enclose the lower section 72 of the interior volume 28 for the housing 24. In such an embodiment, areas above the medial shelf 140 can be readily accessed through the secondary aperture 60 defined by the upper edge 62 of the inner flap 30 and the remainder of the primary aperture 26 of the housing 24. Accordingly, the inner flap 30 can be used for selectively enclosing the lower sections 72 of the interior volume 28 while the remaining other sections of the interior volume 28, including the upper section 70, are readily accessible when the outer door 34 is moved to the open position 36.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A glovebox assembly comprising:
   a housing having a primary aperture for accessing an interior volume;
   an inner flap rotationally coupled to the housing and operable to a securing position within the primary aperture that at least partially encloses the interior volume, wherein the inner flap is coupled to the housing at a primary aperture, wherein operation of the inner flap to an access position provides access to upper and lower sections of the interior volume via the primary aperture, and wherein the inner flap in the securing position defines a secondary aperture between the inner flap and the primary aperture, wherein the secondary aperture provides access to the upper section of the interior volume; and
   an outer door that is rotationally coupled to the housing and selectively operable to an open position to access the interior volume wherein the outer door is operable independently of the inner flap.

2. The glovebox assembly of claim 1, wherein the inner flap is integrally formed with the housing.

3. The glovebox assembly of claim 1, wherein the inner flap is rotationally coupled to the housing at a living hinge.

4. The glovebox assembly of claim 1, further comprising:
   a primary latch that couples with the outer door to define a closed position of the outer door; and
   a secondary latch disposed proximate the primary aperture of the housing, wherein the secondary latch selectively couples with a portion of the inner flap to define the securing position.

5. The glovebox assembly of claim 1, wherein the inner flap in the securing position defines the secondary aperture that is formed between an upper edge of the inner flap and the primary aperture.

6. The glovebox assembly of claim 1, wherein the interior volume is a continuous volume, wherein the inner flap in the securing position divides the interior volume into upper and lower sections.

7. The glovebox assembly of claim 6, wherein the inner flap in the securing position at least partially surrounds the lower section of the interior volume.

8. The glovebox assembly of claim 4, wherein the secondary latch is defined by a tab on the inner flap and a corresponding tab recess defined within the housing proximate the primary aperture.

9. A vehicle storage compartment comprising:
   a housing having an interior volume with upper and lower sections;
   an inner flap that is rotationally coupled to the housing at a living hinge and is operable to selectively surround only the lower section of the interior volume, wherein the interior volume is a continuous volume, wherein the inner flap in a securing position divides the interior volume into upper and lower sections, and wherein the inner flap is coupled to the housing at a primary aperture, wherein operation of the inner flap to an access position provides access to the upper and lower sections of the interior volume via the primary aperture, and wherein the inner flap in the securing position defines a secondary aperture between the inner flap and the primary aperture, wherein the secondary aperture provides access tot the upper section of the interior volume; and
   an outer door that is rotationally operable independent of the inner flap and operable to selectively enclose the upper and lower sections.

10. The vehicle storage compartment of claim 9, further comprising:
    a primary latch that couples with the outer door to define a closed position of the outer door; and
    a secondary latch disposed proximate an aperture of the housing, wherein the secondary latch selectively couples with a portion of the inner flap to define a securing position.

11. The vehicle storage compartment of claim 9, wherein the housing is fixed within a storage area and the outer door is rotationally operable relative to the housing.

12. The vehicle storage compartment of claim 10, wherein the secondary latch is magnetically operated.

13. A vehicle comprising:
    a glovebox housing having a primary aperture and an interior volume;
    an inner flap that is integral with the glovebox housing and is rotationally operable at the primary aperture about a living hinge to selectively enclose a portion of the interior volume in a securing position, wherein die inner flap in an opened access position provides access to upper secondary aperture between the inner flap and the primary aperture, wherein the secondary aperture provides access to the upper section of the interior volume; and
    an outer door that is operable independent of the inner flap to selectively enclose the inner flap and the interior volume.

14. The vehicle of claim 13, wherein the glovebox housing is fixed within a storage area and the outer door is rotationally coupled to the glovebox housing at a hinge.

15. The vehicle of claim 13, wherein the interior volume includes upper and lower sections, and wherein the inner flap is operable to the securing position that selectively encloses only the lower section of the interior volume.

16. The vehicle of claim 15, further comprising:
    a primary latch that couples with the outer door to define a closed position of the outer door; and
    a secondary latch disposed proximate an aperture of the glovebox housing, wherein the secondary latch selectively couples with a portion of the inner flap to define the securing position.

17. The vehicle of claim 13, wherein the outer door is fixedly coupled to the glovebox housing and the outer door and the glovebox housing are rotationally operable within a storage area between closed and open positions, wherein the inner flap is operable about the living hinge when the outer door is away from the closed position.

* * * * *

UNITED STATES PATENT AND TRADEMARK OFFICE
CERTIFICATE OF CORRECTION

PATENT NO. : 10,351,068 B2
APPLICATION NO. : 15/817974
DATED : July 16, 2019
INVENTOR(S) : Moran et al.

Page 1 of 1

It is certified that error appears in the above-identified patent and that said Letters Patent is hereby corrected as shown below:

In the Claims

Column 9,
Claim 9, Line 21:
"tot" should be --to--.

Column 10,
Claim 13, Line 7:
"die" should be --the--.
Claim 13, Line 9:
After "upper" insert --and lower sections of the interior volume, and the inner flap in the securing position defines a--.
Claim 15, Line 21:
After "includes" insert --the--.

Signed and Sealed this
Seventeenth Day of September, 2019

Andrei Iancu
*Director of the United States Patent and Trademark Office*